United States Patent
Agrawal et al.

(10) Patent No.: US 12,292,932 B2
(45) Date of Patent: *May 6, 2025

(54) FAST AND ACCURATE GEOMAPPING

(71) Applicant: INTERNATIONAL BUSINESS MACHINES CORPORATION, Armonk, NY (US)

(72) Inventors: Dakshi Agrawal, Monsey, NY (US); Raghu K. Ganti, Elmsford, NY (US); Mudhakar Srivatsa, White Plains, NY (US); Petros Zerfos, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 18/150,950

(22) Filed: Jan. 6, 2023

(65) Prior Publication Data
US 2023/0161822 A1 May 25, 2023

Related U.S. Application Data

(63) Continuation of application No. 14/230,676, filed on Mar. 31, 2014, now Pat. No. 11,586,680.

(51) Int. Cl.
*G06F 16/00* (2019.01)
*G06F 16/29* (2019.01)
(Continued)

(52) U.S. Cl.
CPC ........ *G06F 16/90344* (2019.01); *G06F 16/29* (2019.01); *G06F 16/9014* (2019.01)

(58) Field of Classification Search
CPC . G06F 16/29; G06F 16/9014; G06F 16/90344
(Continued)

(56) References Cited

U.S. PATENT DOCUMENTS

| 11,586,680 | B2* | 2/2023 | Agrawal | ........... G06F 16/90344 |
| 2008/0291205 | A1 | 11/2008 | Rasmussen et al. | |

(Continued)

FOREIGN PATENT DOCUMENTS

JP     2013045319     3/2013

OTHER PUBLICATIONS

List of IBM Patents or Patent Applications Treated as Related dated Jan. 5, 2023, 2 pages.

(Continued)

*Primary Examiner* — Vincent F Boccio
(74) *Attorney, Agent, or Firm* — Tutunjian & Bitetto, P.C.; Samuel Waldbaum

(57) ABSTRACT

A system and method are provided for discovering k-nearest-neighbors to a given point within a certain distance d. The method includes constructing an index of geometries using geohashes of geometries as an indexing key to obtain an indexed set of geometries, and calculating a geohash representation of the given point with a resolution equal to a magnitude value of d. The method includes searching for a closest-prefix geometry from the indexed set using the geohash representation of the given point, and identifying geometries from the indexed set having a same prefix as the closest-prefix geometry. The method further includes calculating distances between the given point and the geometries identified from the indexed set having the same prefix as the closest-prefix geometry, and determining k geometries with respective shortest distances less than d from the geometries identified from the indexed set having the same prefix as the closest-prefix geometry.

20 Claims, 5 Drawing Sheets

(51) Int. Cl.
*G06F 16/901* (2019.01)
*G06F 16/903* (2019.01)

(58) Field of Classification Search
USPC .......................................................... 707/743
See application file for complete search history.

(56) References Cited

U.S. PATENT DOCUMENTS

| | | |
|---|---|---|
| 2010/0121710 A1 | 5/2010 | Chipman et al. |
| 2012/0226889 A1 | 9/2012 | Merriman et al. |
| 2013/0013661 A1 | 1/2013 | Inakoshi et al. |
| 2013/0097163 A1 | 4/2013 | Oikarinen et al. |
| 2013/0238632 A1 | 9/2013 | Urquhart |

OTHER PUBLICATIONS

Wikipedia "GEOHASH" <http://en.wikipedia.org/wiki/Geohash> Dec. 2012. (6 Pages).
Ganti et al. "Mapping Uncertain Geometries to Graticules" IBM Confidential, Dec. 2012. (4 Pages).

* cited by examiner

FAST AND ACCURATE GEOMAPPING

GOVERNMENT RIGHTS

This invention was made with Government support under Contract No.: W911NF-09-2-0053 awarded by the Army Research Office (ARO). The Government has certain rights in this invention.

BACKGROUND

Technical Field

The present invention relates generally to mapping and, in particular, to fast and accurate geomapping.

Description of the Related Art

Geomapping is finding the "K-closest" objects that lie in the area within a certain distance (radius) from a given location and is used in a number of located-based applications. Geomapping has been used for the identification of points of interests in a map (e.g., find the 20 closest restaurants, ATMs, theatres, and so forth within a 1-mile radius from the location of a user), proximity-based queries (e.g., find the 10 closest taxis with respect to a user's location), and demographics-based queries & foot-traffic discovery (e.g., find 100 mobile users that are located the closest within 0.3 miles from a restaurant and email them a promotional code).

The ability to perform a large number of such operations in a short time (i.e., at a high-throughput) can enable businesses to make decisions in real-time based on proximity. Traditionally, for geomapping, solutions have used a variation of R-tree (e.g., IBM® Informix Spatial DataBlade) or a grid index (e.g., IBM® DB2 spatial) to store latitude and longitude values (treating them as a two dimensional Cartesian values). These techniques "initially ignore" the fact that the Earth is not flat and apply various pre-search and post-search operations to obtain results. The benefit of this approach is the use of well-understood traditional indexing data-structures. However, the drawback is the required additional operations that account for the Earth's shape, which significantly slow down queries.

More recently, geohashes have been used to first convert latitude and longitude into a single bit vector (of length up to 32 bits). The index is implemented on top of the standard B-tree index. The preceding implementation results in higher throughput than traditional methods. However, the results can be inaccurate due to the one-sided "closeness" property of geohashes. In fact, it is well-established in the current state-of-the-art that geohashes are of limited use for proximity searches.

SUMMARY

According to an aspect of the present principles, there is provided a method for discovering k-nearest-neighbors to a given point within a certain distance d. The method includes constructing an index of geometries using geohashes of geometries as an indexing key to obtain an indexed set of geometries. The method further includes calculating a geohash representation of the given point with a resolution equal to a magnitude value of the certain distance d. The method also includes searching for a closest-prefix geometry from the indexed set of geometries using the geohash representation of the given point. The method additionally includes identifying geometries from the indexed set of geometries that have a same prefix as the closest-prefix geometry. The method further includes calculating distances between the given point and the geometries identified from the indexed set of geometries that have the same prefix as the closest-prefix geometry. The method also includes determining k geometries with respective shortest distances less than d from the geometries identified from the indexed set of geometries that have the same prefix as the closest-prefix geometry.

According to another aspect of the present principles, there is provided a system for discovering k-nearest-neighbors to a given point within a certain distance d. The system includes an index constructor that constructs an index of geometries using geohashes of geometries as an indexing key to obtain an indexed set of geometries. The system further includes a geohash representation calculator that calculates a geohash representation of the given point with a resolution equal to a magnitude value of the certain distance d. The system also includes a geohash-representation-based searcher that searches for a closest-prefix geometry from the indexed set of geometries using the geohash representation of the given point, and identifies geometries from the indexed set of geometries that have a same prefix as the closest-prefix geometry. The system additionally includes a prefix-based distance calculator that calculates distances between the given point and the geometries identified from the indexed set of geometries that have the same prefix as the closest-prefix geometry. The system further includes a top-k nearest-neighbors determiner that determines k geometries with respective shortest distances less than d from the geometries identified from the indexed set of geometries that have the same prefix as the closest-prefix geometry.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
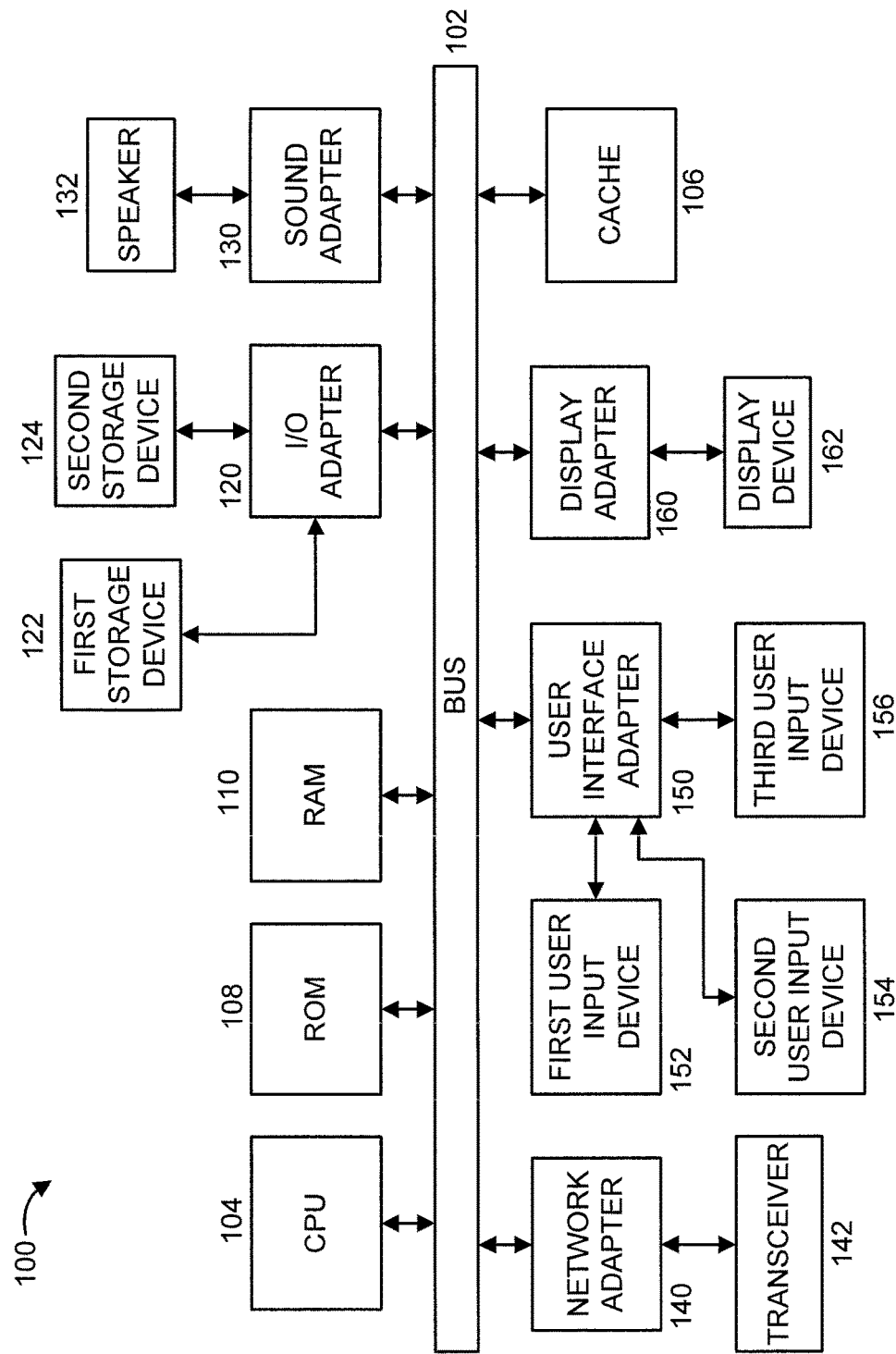
FIG. 1 shows an exemplary processing system 100 to which the present principles may be applied, in accordance with an embodiment of the present principles.

The present principles are directed to fast and accurate geomapping.

The present principles are directed to performing geomapping using geohashes that remove the perceived limitation regarding geohashes being of limited use for proximity searches. Geomapping in accordance with the present principles advantageously provides accurate results (no false positives/negatives) and works at an extremely high throughput.

In an embodiment, the present principles exploit and/or otherwise use the following two ideas: (a) the calculation of "geohash covers", which is a new concept to ensure accurate results; (b) the use of a patricia trie to minimize the number of calculations while searching the index to provide high throughput.

In an embodiment, the present principles advantageously prune the space of possible objects of interest using the adaptive resolution property of geohash encoding combined with fast common-prefix string lookup techniques. The adaptive resolution property of geohash involves the capability to remove characters from the end of a geocode to reduce the size of the geocode which also has the effect of reducing the precision of the geocode. The precision reduction can advantageously be implemented on a gradual scale. Advantages of the preceding approach include the avoidance of performing expensive distance calculations between a given geo-location and the full set of objects of interest that might be available (and that can be in the order of millions of objects), and the adaptive reduction of the required distance calculations.

The closer the distance ("radius") from a given geo-location (i.e., the higher the accuracy) the faster the geo-mapping operation becomes as more aggressive pruning and a smaller number of objects are returned.

Advantageously, the present principles combine the encoding of geometric objects using geohashing operations and fast common-prefix lookups using string matching.

One advantage of the present principles over the prior art lies in the coverage of both geometries and queries (which are typically special geometries such as circle/rectangle) as geohash binary strings. Each geohash string represents a lat-lon box (latitude-longitude box), where a set of such boxes can be used to compactly cover any geometry. The geohash representation of these lat-lon boxes has the following property: if geohash string h is a prefix of h', then the lat-lon box represented by h covers the lat-lon box represented by h'. Hence, after breaking down the geometries and the query into geohash strings, overlap can be verified using fast string prefix matching algorithms. In particular, both indexing and querying can be computed in O(log n), where n is the total number of geometries. In addition, string prefix search operations can be hardware accelerated using BCAMs/TCAMs (binary content-addressable memories/ternary content-addressable memories).

A brief description will now be given regarding the steps performed to index/store a geometry g, in accordance with an embodiment of the present principles. A more detailed description of the steps performed to index/store a geometry g is provided with respect to FIG. 3.

(1) Compute a geohash cover for geometry g (i.e., a set of geohash binary strings such that the lat-lon boxes encoded by these geohash strings cover geometry g). The computation of the geohash cover can correspond to, e.g., step 515 in FIG. 5.

(2) Using binary strings obtained from (1) as a key, store geometry g in a prefix tree (that allows efficient lookup/search for prefix matching)—such as binary tree, compacted binary tree, patricia trie, etc. The storage of geometry g can correspond to, e.g., step 520 in FIG. 5.

Figure 3:
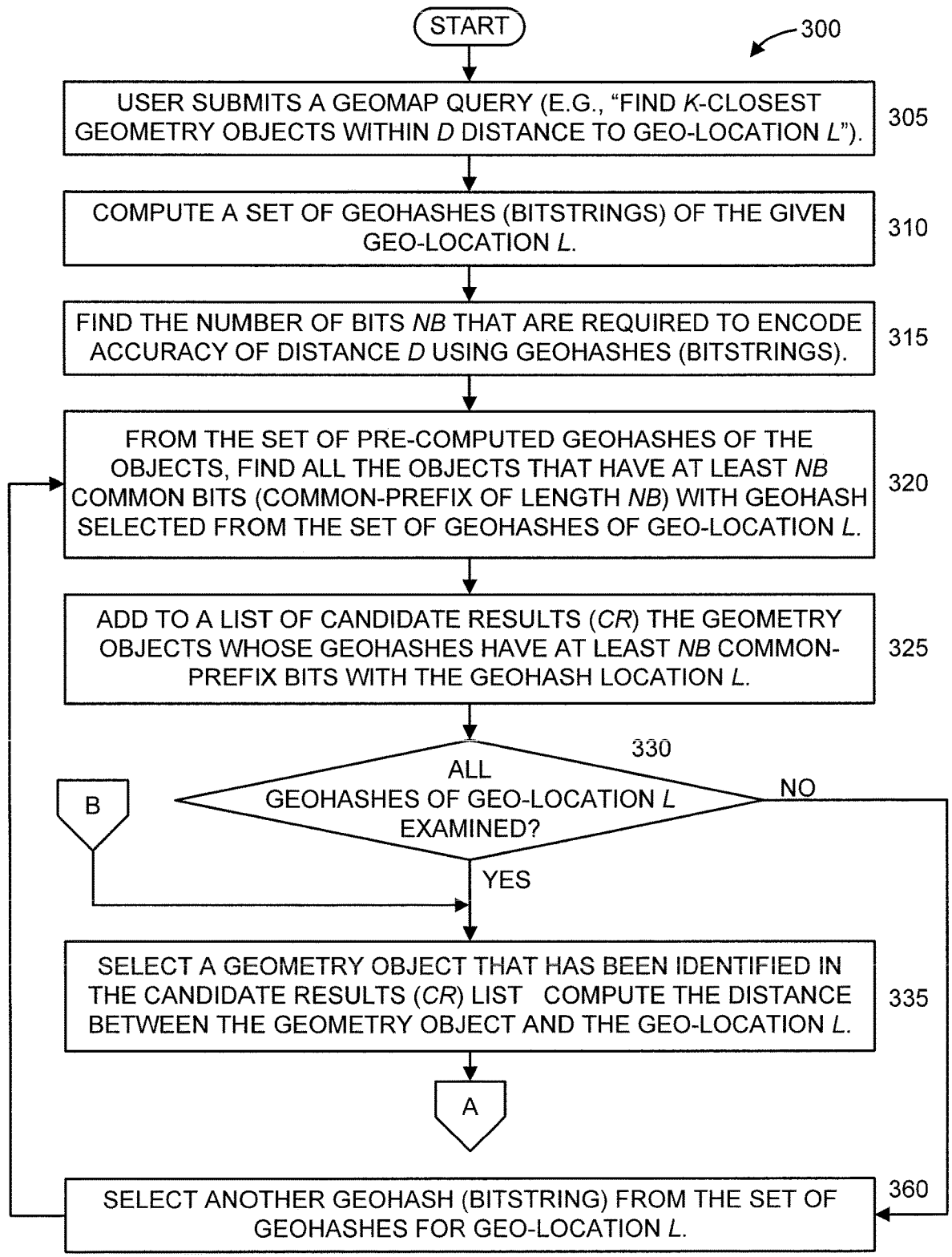
FIGS. 3 and 4 show an exemplary method 300 for answering a geomap query, in accordance with an embodiment of the present principles.
Figure 4:
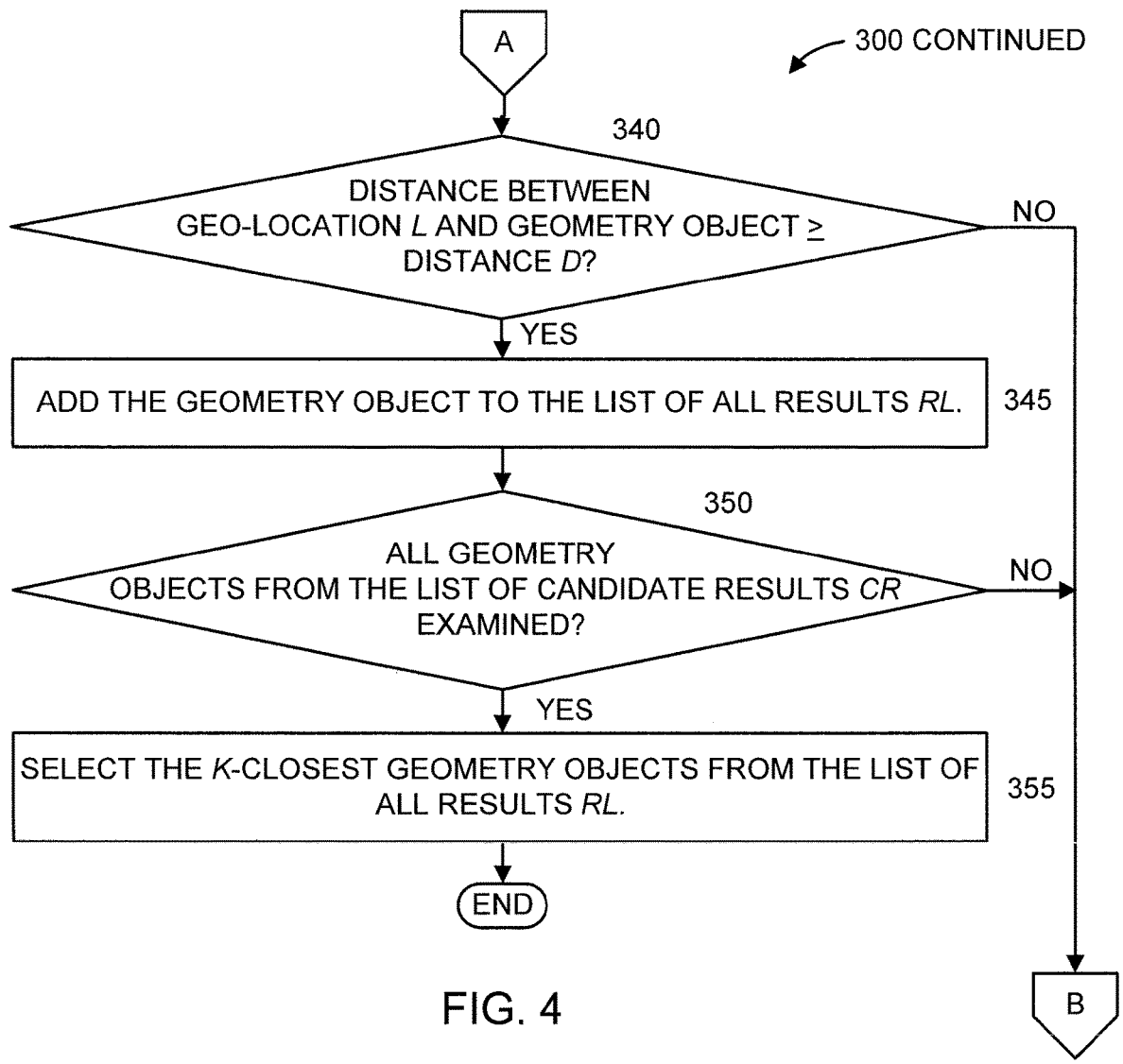

A brief description will now be given regarding the steps performed to query a given point p, radius r, and parameter k (k-nearest neighbors), in accordance with an embodiment of the present principles. FIGS. 3 and 4 hereinafter described a method 300 for answering a geomap query.

(1) Compute a geohash cover for a circle centered at p and radius r (i.e., a set of geohash binary strings such that the lat-lon boxes encoded by the geohash strings cover the circle).

(2) For each binary string b in the cover:

(2a) Lookup binary string b in the prefix tree and obtain all matching geometries, (2b) Compute exact distance between geometries obtained in (2a) and point p; select geometries that are within a distance r from p.

(3) Select top-k closes geometries from the result obtained in (2)

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 102 by the sound adapter 130.

A transceiver 142 is operatively coupled to system bus 102 by network adapter 140.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

A display device 162 is operatively coupled to system bus 102 by display adapter 160.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
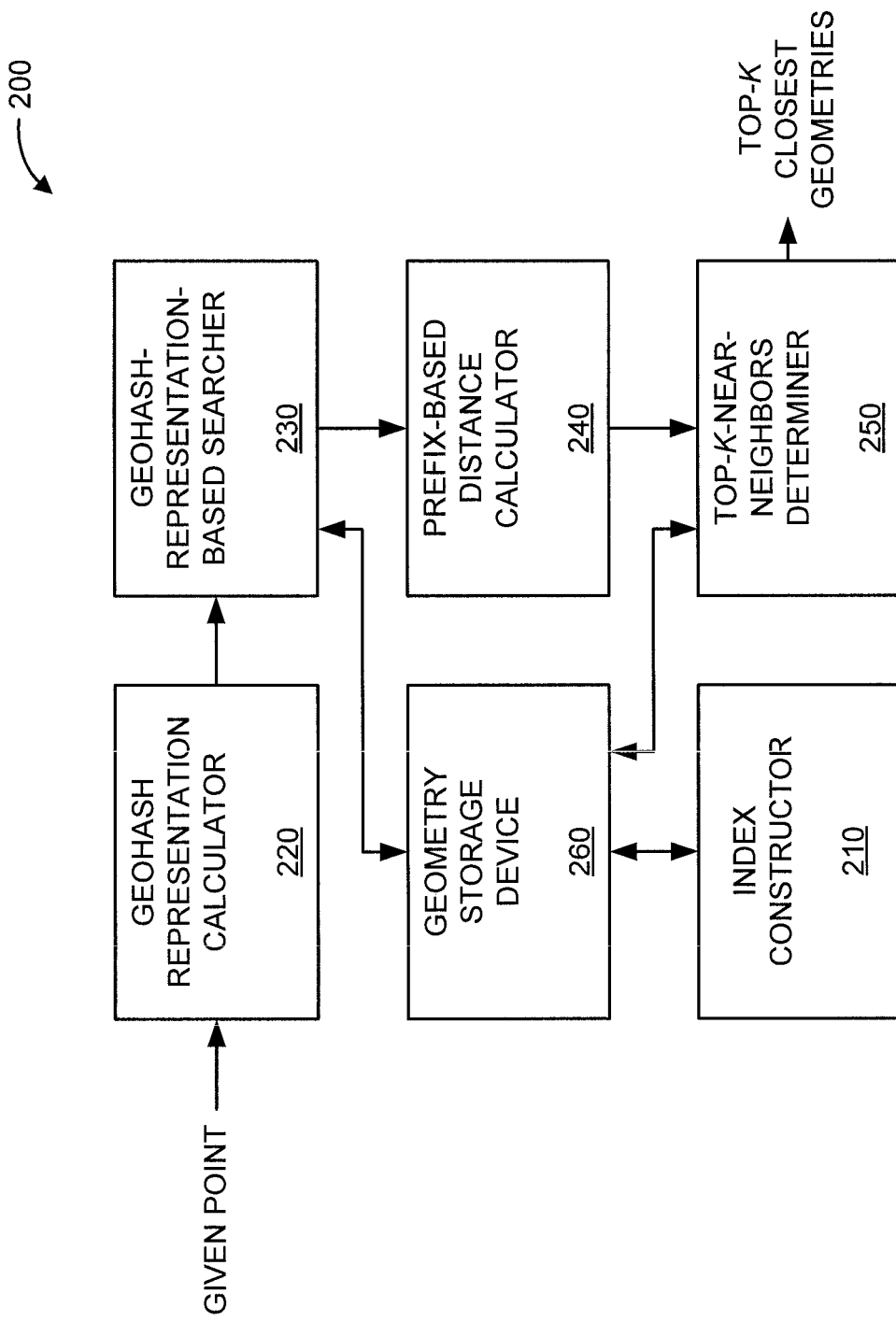
FIG. 2 shows an exemplary geomapping system 200, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 5:
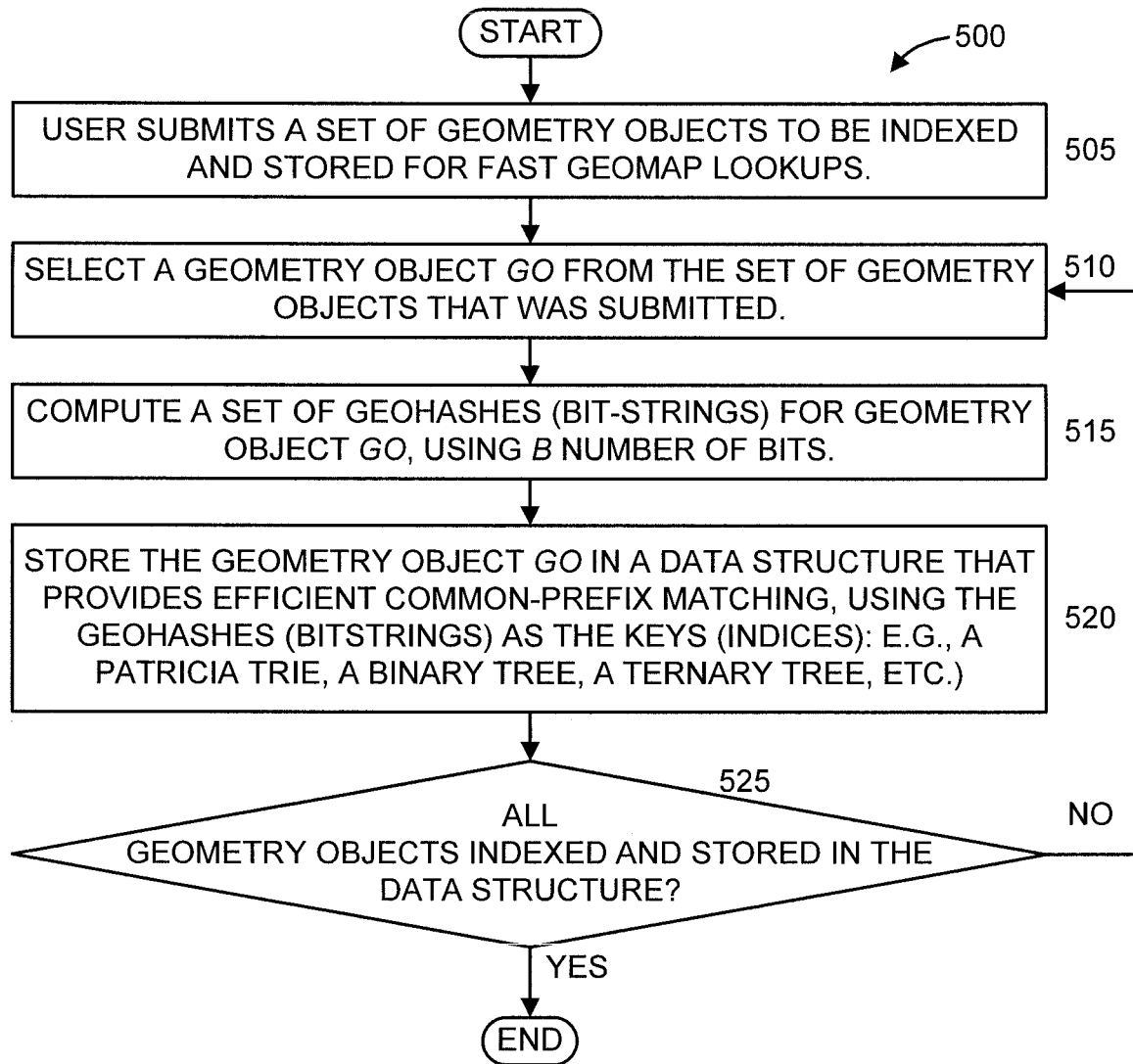
FIG. 5 shows an exemplary method 500 for indexing geometry objects for fast lookup in geomapping operations, in accordance with an embodiment of the present principles.

Further, it is to be appreciated that processing system 100 may perform at least part of the method described herein including, for example, at least part of method 300 of FIGS. 3-4 and/or at least part of method 500 of FIG. 5. Similarly, part or all of system 200 may be used to perform at least part of method 300 of FIGS. 3-4 and/or at least part of method 500 of FIG. 5.

FIG. 2 shows an exemplary geomapping system 200, in accordance with an embodiment of the present principles. The system 200 is capable of discovering k-nearest-neighbors to a given point within a certain distance d. The geomapping system 200 includes an index constructor 210, a geohash representation calculator 220, a geohash-representation-based searcher 230, a prefix-based distance calculator 240, a top-k nearest-neighbors determiner 250, and a geometry storage device 260.

The index constructor 210 constructs an index of geometries using geohashes of geometries as an indexing key to obtain an indexed set of geometries. The index constructor 210 is connected to a geometry storage device 260 accessible using the index. The geometry storage device 260 stores the indexed set of geometries.

The geohash representation calculator 220 calculates a geohash representation of the given point with a resolution equal to a magnitude value of the certain distance d.

The geohash-representation-based searcher 230 searches for a closest-prefix geometry from the indexed set of geometries using the geohash representation of the given point. The geohash-representation-based searcher 230 also identifies geometries from the indexed set of geometries that have a same prefix as the closest-prefix geometry.

The prefix-based distance calculator 240 calculates distances between the given point and the geometries identified from the indexed set of geometries that have the same prefix as the closest-prefix geometry.

The top-k nearest-neighbors determiner 250 determines k geometries with respective shortest distances less than d from the geometries identified from the indexed set of geometries that have the same prefix as the closest-prefix geometry.

While shown as separate devices, one or more of the index constructor 210, the geohash representation calculator 220, the geohash-representation-based searcher 230, the prefix-based distance calculator 240, and the top-k nearest-neighbors determiner 250 can be combined into a single element of system 200. Moreover, in an embodiment, at least one of these elements includes a processor (not shown in FIG. 2, but shown in FIG. 1) accessible by other ones of the elements. In another embodiment, a separate processor is provided with respect to the above elements, where the separate processor is accessible by the elements of system 200. However, in all cases, at least a processor and a memory are included in system 200, whether within one or more of the elements and accessible by other ones of the elements or separate from but accessible by one or more of the elements of system 200. Moreover, in an embodiment, one or more buses can be used to interconnect one or more elements of system 200. These and other variations of system 200 are readily determined by one of ordinary skill in the art given the teachings of the present principles provided herein, while maintaining the spirit of the present principles.

FIGS. 3 and 4 show an exemplary method 300 for answering a geomap query, in accordance with an embodiment of the present principles.

At step 305, a user submits a geomap query. In the example of FIG. 3, the query is "find k-closest geometry objects within D distance to geo-location L".

At step 310, compute a set of geohashes (bitstrings) of the given geo-location L.

At step 315, find the number of bits NB that are required to encode accuracy of distance D using geohashes (bit-strings).

At step 320, from the set of pre-computed geohashes of the objects, find all the objects that have at least NB common bits (common-prefix of length NB) with geohash selected from the set of geohashes of geo-location L.

At step 325, add to a list of candidate results (CR) the geometry objects whose geohashes have at least NB common-prefix bits with the geohash location L.

At step 330, it is determined whether or not all geohashes of geo-location L have been examined. If so, then the method continues to step 335. Otherwise, the method continues to step 360.

At step 335, select a geometry object that has been identified in the candidate results (CR) list. Compute the distance between the geometry object and the geo-location L.

At step 340, it is determined whether or not the distance between geo-location L and the geometry object is less than or equal to distance D. If so, then the method proceeds to step 345. Otherwise, the method returns to step 335.

At step 345, add the geometry object to the list of all results RL.

At step 350, it is determined whether or not all geometry objects from the list of candidate results CR have been examined. If so, then the method proceeds to step 355. Otherwise, the method returns to step 335.

At step 355, select the k-closest geometry objects from the list of all results RL.

At step 360, select another geohash (bitstring) from the set of geohashes for the geo-location L.

FIG. 5 shows an exemplary method 500 for indexing geometry objects for fast lookup in geomapping operations, in accordance with an embodiment of the present principles.

At step 505, a user submits a set of geometry objects to be indexed and stored for fast geomap lookups.

At step 510, select a geometry object GO from the set of geometry objects that was submitted.

At step 515, compute a set of geohashes (bitstrings) for geometry object GO, using B number of bits.

At step 520, store the geometry object GO in a data structure that provides efficient common-prefix matching, using the geohashes (bit-strings) as the keys (indices): e.g., a patricia trie, a binary tree, a ternary tree, and so forth.

At step 525, it is determined whether or not all geometry objects have been indexed and stored in the data structure that provides efficient common-prefix matching. If so, then the method is terminated, as geometry objects can now be efficiently looked up based on their geohashes (bit-strings). Otherwise, the method returns to step 510.

One particular problem that has plagued the prior art is how to enable geomapping operations for moving objects at high throughput with accurate results. Advantageously, the present principles address and solve this problem. For example, the present principles advantageously prune the space of possible objects of interest using the adaptive resolution property of geohash encoding combined with fast common-prefix string lookup techniques.

The present principles also involve the following concepts: fast common-prefix string lookup techniques include patricia trie, binary trees, ternary trees, and so forth; resolution at multiple distances is already represented in the geohash-encoding of geometries (in bit string representation); and location search and updates are string operations in the trie/tree structure.

Moreover, in accordance with the present principles, the performing of expensive distance calculations is avoided between a given geo-location and the full set of objects of interest that might be available.

Further, in accordance with the present principles, the required distance calculations are adaptively reduced. For example, in an embodiment, the closer the distance ("radius") from a given geo-location (i.e. the higher the accuracy) the faster the geomapping operation. Also, in an embodiment, more aggressive pruning is performed to return a smaller number of objects.

Additionally, in accordance with the present principles, geohash encoding is extended to support rectangular lat-lon boxes. Rectangular geohashes cannot be encoded as binary strings; however, they can encoded as ternary strings (e.g., lat=10 and lon=1011=>11001?1?). For the ternary strings, 0 is the first value, 1 is the second value, and ? is the third value. The extension supports additional dimensions besides latitude and longitude such as time and altitude (e.g., lat=10, lon=101, time=01=>10??101?01??). Moreover, the extension allows storing and retrieving ternary encoded geohashes using TCAMs (associate memory for supporting ternary string matching).

These and many other attendant advantages of the present principles are readily determinable and appreciated by one of ordinary skill in the art, given the teachings of the present principles provided herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for discovering k-nearest-neighbors to a given object represented by a point within a certain linear, one-dimensional distance d, comprising:
    obtaining an indexed set of geometries, and pruning a space of possible objects by gradually removing characters from one or more geocodes, the pruning enabling geomapping of the object represented by the point and minimizing a number of distance calculations by utilizing adaptive resolution properties of geohash;
    calculating a geohash representation of the point with an adaptive resolution equal to a magnitude value of the certain linear, one-dimensional distance d, the calculating the geohash representation including determining a number of bits needed to encode accuracy of the distance d using the geohash representation;
    searching for a closest-prefix geometry from the indexed set of geometries using the geohash representation of the point to identify all objects including at least a number of bits needed to encode accuracy of the distance d using the geohash representation;
    calculating linear, one-dimensional distances between the point and geometries identified from the indexed set of geometries that have a same prefix as the closest-prefix geometry; and
    determining k geometries with respective shortest linear, one-dimensional distances less than d from the geometries identified from the indexed set of geometries that have the same prefix as the closest-prefix geometry.

2. The method of claim 1, wherein the index of geometries is formed as a data structure supporting prefix-based string matching.

3. The method of claim 1, wherein the index of geometries is formed as at least one of a patricia trie, a binary tree, and a ternary tree.

4. The method of claim 1, wherein the geohash representation of the given point is one of a string of bits or a vector of bits.

5. The method of claim 1, wherein said searching and calculating distances use respective prefix-matching string operations of a data structure supporting prefix-based string matching to find the closest-prefix geometry and the geometries identified from the indexed set of geometries that have the same prefix as the closest-prefix geometry.

6. The method of claim 5, wherein the data structure is at least one of a patricia trie, a binary tree, and a ternary tree.

7. The method of claim 1, wherein different resolutions are used for representing longitudes versus latitudes.

8. The method of claim 7, further comprising:
    dividing a respective rectangular geometry space for a respective geometry in the indexed set of geometries into a respective lat-lon box;
    encoding the respective lat-lon box into a ternary string; and
    supporting storage of and queries on the ternary string using a hardware accelerated ternary content-addressable memory.

9. The method of claim 8, wherein the geohash representation is extensible to multiple dimensions with a heterogeneous resolution.

10. The method of claim 9, wherein the multiple dimensions comprise longitude, latitude, and at least one of time and altitude.

11. A computer readable storage medium comprising a computer readable program for discovering k-nearest-neighbors to a given object represented by a point within a certain linear, one-dimensional distance d, wherein the computer readable program when executed on a computer causes the computer to perform the steps of:

obtaining an indexed set of geometries, and pruning a space of possible objects by gradually removing characters from one or more geocodes, the pruning enabling geomapping of the object represented by the point and minimizing a number of distance calculations by utilizing adaptive resolution properties of geohash;

calculating a geohash representation of the point with an adaptive resolution equal to a magnitude value of the certain linear, one-dimensional distance d, the calculating the geohash representation including determining a number of bits needed to encode accuracy of the distance d using the geohash representation;

searching for a closest-prefix geometry from the indexed set of geometries using the geohash representation of the point to identify all objects including at least a number of bits needed to encode accuracy of the distance d using the geohash representation;

calculating linear, one-dimensional distances between the point and geometries identified from the indexed set of geometries that have a same prefix as the closest-prefix geometry; and determining k geometries with respective shortest linear, one-dimensional distances less than d from the geometries identified from the indexed set of geometries that have the same prefix as the closest-prefix geometry.

12. A system for discovering k-nearest-neighbors to a given object represented by a point within a certain linear, one-dimensional distance d, comprising:

a hardware processor operatively connected to a non-transitory computer-readable storage medium, the process being configured for:

obtaining an indexed set of geometries, and pruning a space of possible objects by gradually removing characters from one or more geocodes, the pruning enabling geomapping of the object represented by the point and minimizing a number of distance calculations by utilizing adaptive resolution properties of geohash;

calculating a geohash representation of the point with an adaptive resolution equal to a magnitude value of the certain linear, one-dimensional distance d, the calculating the geohash representation including determining a number of bits needed to encode accuracy of the distance d using the geohash representation;

searching for a closest-prefix geometry from the indexed set of geometries using the geohash representation of the point to identify all objects including at least a number of bits needed to encode accuracy of the distance d using the geohash representation;

calculating linear, one-dimensional distances between the point and geometries identified from the indexed set of geometries that have a same prefix as the closest-prefix geometry; and determining k geometries with respective shortest linear, one-dimensional distances less than d from the geometries identified from the indexed set of geometries that have the same prefix as the closest-prefix geometry.

13. The system of claim 12, wherein the index of geometries is formed as a data structure supporting prefix-based string matching.

14. The system of claim 12, wherein the index of geometries is formed as at least one of a patricia trie, a binary tree, and a ternary tree.

15. The system of claim 12, wherein the geohash representation of the given point is one of a string of bits or a vector of bits.

16. The system of claim 12, wherein the geohash-representation-based searching uses respective prefix-matching string operations of a data structure supporting prefix-based string matching to find the closest-prefix geometry and the geometries identified from the indexed set of geometries that have the same prefix as the closest-prefix geometry.

17. The system of claim 16, wherein the data structure is at least one of a patricia trie, a binary tree, and a ternary tree.

18. The system of claim 12, wherein different resolutions are used for representing longitudes versus latitudes.

19. The system of claim 12, wherein the geohash representation is extensible to multiple dimensions with a heterogeneous resolution.

20. The system of claim 19, wherein the multiple dimensions comprise longitude, latitude, and at least one of time and altitude.

* * * * *